(12) United States Patent
Yasui et al.

(10) Patent No.: US 6,766,888 B2
(45) Date of Patent: Jul. 27, 2004

(54) ROTATION TRANSMISSION DEVICE

(75) Inventors: Makoto Yasui, Shizuoka (JP); Koji Sato, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/243,916

(22) Filed: Sep. 16, 2002

(65) Prior Publication Data

US 2003/0051961 A1 Mar. 20, 2003

(30) Foreign Application Priority Data

Sep. 17, 2001 (JP) ........................................ 2001-281138

(51) Int. Cl.[7] .......................... B60K 23/08; F16D 21/08
(52) U.S. Cl. ........................... 192/35; 192/38; 192/84.8
(58) Field of Search ............................. 192/35, 38, 44, 192/84.8, 107 R; 335/279, 281

(56) References Cited

U.S. PATENT DOCUMENTS

| | | | | |
|---|---|---|---|---|
| 6,132,332 A | * | 10/2000 | Yasui | 477/36 |
| 6,244,403 B1 | * | 6/2001 | Ito et al. | 192/35 |
| 6,257,386 B1 | * | 7/2001 | Saito et al. | 192/48.2 |
| 6,364,084 B1 | * | 4/2002 | Boyer et al. | 192/84.961 |
| 6,409,004 B1 | * | 6/2002 | Kawada et al. | 192/84.961 |

FOREIGN PATENT DOCUMENTS

JP          11-129779          5/1999

* cited by examiner

Primary Examiner—Richard M. Lorence
(74) Attorney, Agent, or Firm—Wenderoth, Lind & Ponack L.L.P.

(57) ABSTRACT

A rotation transmission device is provided which is used to selectively transmit power. The aim is to stabilize the frictional torque when the rotor of an electromagnet absorbs an armature. A retainer is mounted between an inner member and an outer member, and is formed with a plurality of pockets, and engaging elements are mounted in the pockets. An armature is mounted so as to be nonrotatable but axially movable relative to the retainer, and a rotor is mounted to the inner member or the outer member so as to axially oppose the armature. An electromagnet attracts the armature to the rotor, thereby changing the phase of the retainer to bring the engaging elements into engagement with the outer periphery of the inner member and the inner periphery of the outer member, and thereby transmitting a turning torque between the inner member and the outer member. When the armature is attracted to the rotor, the large-diameter portion of the armature is attracted to the rotor.

14 Claims, 6 Drawing Sheets

ROTATION TRANSMISSION DEVICE

BACKGROUND OF THE INVENTION

This invention relates to a rotation transmission device for carrying out changeover between transmission and shutoff of a driving force in a drive line of, for example, a vehicle.

Generally, in a 4 WD vehicle in which the front and rear wheels are directly connected together, when the vehicle turns on a paved road, a so-called tight corner braking phenomenon occurs. In order to solve this problem, for changeover between connection and disconnection of power to the front and rear wheels of a 4 WD vehicle, the present applicant has already proposed a rotation transmission device in which a roller type two-way clutch and an electromagnetic clutch are combined (JP patent publication 11-129779).

In the prior art rotation transmission device, the roller type two-way clutch is mounted between an inner member connected to an input shaft and an outer member provided around the inner member. An electromagnetic clutch is provided at one axial end of the two-way clutch.

In this two-way clutch, a plurality of cam surfaces are formed on the outer periphery of the inner member, a cylindrical surface is formed on the inner periphery of the outer member, a retainer is mounted between the inner member and the outer member, and rollers are mounted in pockets formed in the retainer. The elastic force of a switch spring is imparted to the retainer to keep the rollers in a neutral position in which the rollers are not in engagement with the cam surfaces of the inner member or the cylindrical surface of the outer member. When the inner member and the retainer rotate relative to each other against the elastic force of the switch spring, the rollers engage the cam surfaces of the inner member and the cylindrical surface of the outer member, thereby transmitting the rotation of the inner member to the outer member.

On the other hand, the electromagnetic clutch has a rotor mounted on the outer member so as to axially face an armature that is prevented from turning but that is axially movable relative to the retainer. An electromagnet is mounted in the rotor on the opposite side of the armature.

In this conventional rotation transmission device, when the electromagnetic coil of the electromagnet is not energized, the rollers are kept in the neutral position by the elastic force of the switch spring, so that the rotation of the inner member will not be transmitted to the outer member and the inner member idles relative to the outer member. On the other hand, when the electromagnetic coil of the electromagnet is energized, it will attract the armature to the rotor, so that the retainer will not rotate relative to the outer member. Due to the rotation of the inner member relative to the retainer, the rollers will engage the cam surfaces of the inner member and the cylindrical surface of the outer member, so that the rotation of the inner member is transmitted to the outer member through the rollers.

When the armature is attracted to the rotor, if the force for attracting the armature is weak, the armature will not be fixed to the outer member so as not to rotate relative to the outer member due to the elastic force of the switch spring. Therefore, it will be impossible to bring the engaging elements into engagement with the cam surfaces of the inner member and the cylindrical surface of the outer member. Thus it becomes necessary to impart a greater frictional torque to the armature so that the retainer will not return to the neutral position due to the turning torque by the switch spring.

In the conventional rotation transmission device, since the entire opposing surfaces of the rotor and the armature are attracting surfaces, the frictional torque when the rotor attracts the armature varies widely depending on the state of the attracting surfaces when in mutual contact, so that the frictional torque tends to be unstable. For example, if the rotor and the armature contact each other only at their inner-diameter side, the contact radius is small, so that the frictional torque. decreases correspondingly. Also, if the flatness of the attracting surfaces is poor, an air gap may develop. These portions become so-called air gaps through which magnetic fluxes are difficult to pass, thus lowering the attracting force. This makes it impossible to generate a predetermined frictional torque and delay response when the rollers engage. In the worst case, it may become impossible to cause the rollers to engage, so that no power transmitting state is obtained.

An object of this invention is to provide a rotation transmission device which makes it possible to stabilize the frictional torque when the rotor has attracted the armature.

SUMMARY OF THE INVENTION

According to this invention, there is provided a rotation transmission device comprising an inner member and an outer member coaxially mounted so as to be rotatable relative to each other, a retainer mounted between the inner member and the outer member and formed with a plurality of pockets, engaging elements mounted in the pockets, an armature mounted so as to be nonrotatable but axially movable relative to the retainer, a rotor mounted to one of the inner member and the outer member so as to axially oppose the armature, and an electromagnet for attracting the armature to the rotor. The phase of the retainer is changed to bring the engaging elements into engagement with the outer periphery of the inner member and the inner periphery of the outer member, and a turning torque is transmitted between the inner member and the outer member. When the armature is attracted to the rotor, the large-diameter portion of the armature is attracted to the rotor.

The means for attracting the large-diameter portion of the armature to the rotor may be a step formed on at least one of the opposed surfaces of the rotor and the armature so as to make the large-diameter portion higher than the small-diameter portion, or a tapered surface formed on at least one of the opposed surfaces of the rotor and the armature such that its axial height gradually lowers from the large-diameter side toward the small-diameter side.

With this arrangement, when the electromagnet is energized, the large-diameter portion of the armature is attracted to the rotor, so that the radius of the contact portion between the rotor and the armature stabilizes. This makes it possible to stabilize the frictional torque.

By forming an annular groove in the surface of the rotor that opposes the armature and forming arcuate elongated holes in the bottom of the annular groove in the circumferential direction, it is possible to prevent magnetic flux from directly passing through the attracting plate portion of the rotor so as to attract the armature more reliably.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
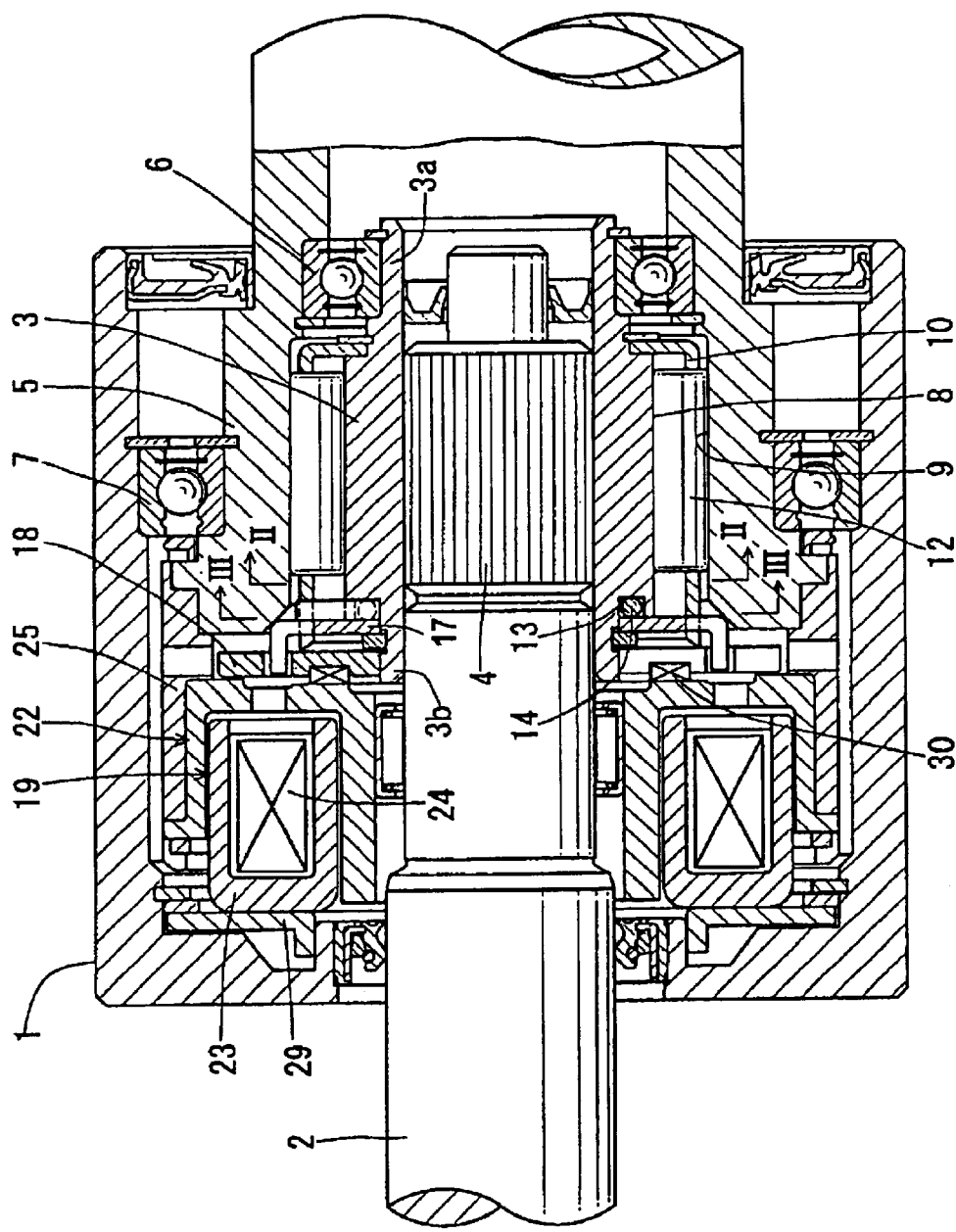
FIG. 1 is a longitudinal sectional front view showing an embodiment of the rotation transmission device according to this invention.

Hereinbelow, an embodiment of this invention will be described with reference to the drawings. As shown in FIG. 1, a rotary shaft 2 is inserted in a housing 1. An inner member 3 is fitted on one end of the rotary shaft 2. The rotary shaft 2 and the inner member 3 are joined together by serrations 4.

The inner member 3 has small-diameter cylindrical portions 3a, 3b at both ends thereof. On the inner member 3, a tubular outer member 5 is coaxially mounted. The inner member 3 and the outer member 5 are relatively rotatably supported by a bearing 6 mounted on the cylindrical portion 3a at one end of the inner member 3. The outer member 5 is rotatably supported by a bearing 7 mounted on the inner surface of the housing 1.

Figure 2:
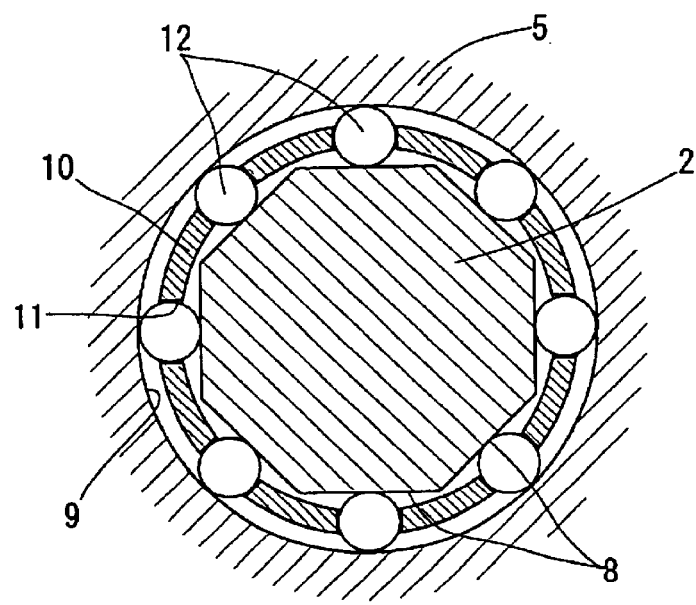
FIG. 2 is a sectional view along line II—II of FIG. 1.

As shown in FIGS. 1 and 2, a plurality of cam surfaces 8 are formed on the outer periphery of the inner member 3. On the other hand, on the inner periphery of the outer member 5, a cylindrical surface 9 is formed so as to define wedge spaces between it and the cam surfaces 8.

A retainer 10 is mounted between the inner member 3 and the outer member 5. Pockets 11 are formed in the retainer 10. An engaging element 12 comprising a roller is mounted in each pocket 11.

Figure 3:
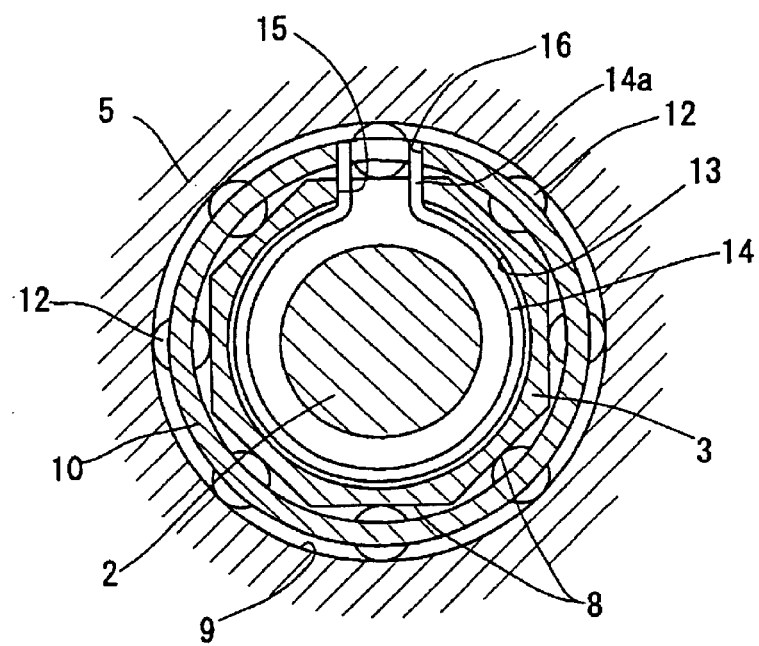
FIG. 3 is a sectional view along line III—III of FIG. 1

As shown in FIGS. 1 and 3, a spring-receiving recess 13 is formed in the other end of the inner member 3. In the recess 13, a switch spring 14 is mounted. The switch spring 14 has a pair of bent portions 14a at its ends. Each bent portion 14a is inserted through a window 15 formed in the peripheral wall of the recess 13 into one of an opposed pair of cutouts 16 formed in an end of the retainer 10 to bias the circumferentially opposing end faces of the cutout 16 in opposite directions. Due to the switch spring 14, the retainer 10 is held in a neutral position where the engaging elements 12 do not engage with the cam surfaces 8 or the cylindrical surface 9.

Figure 4:
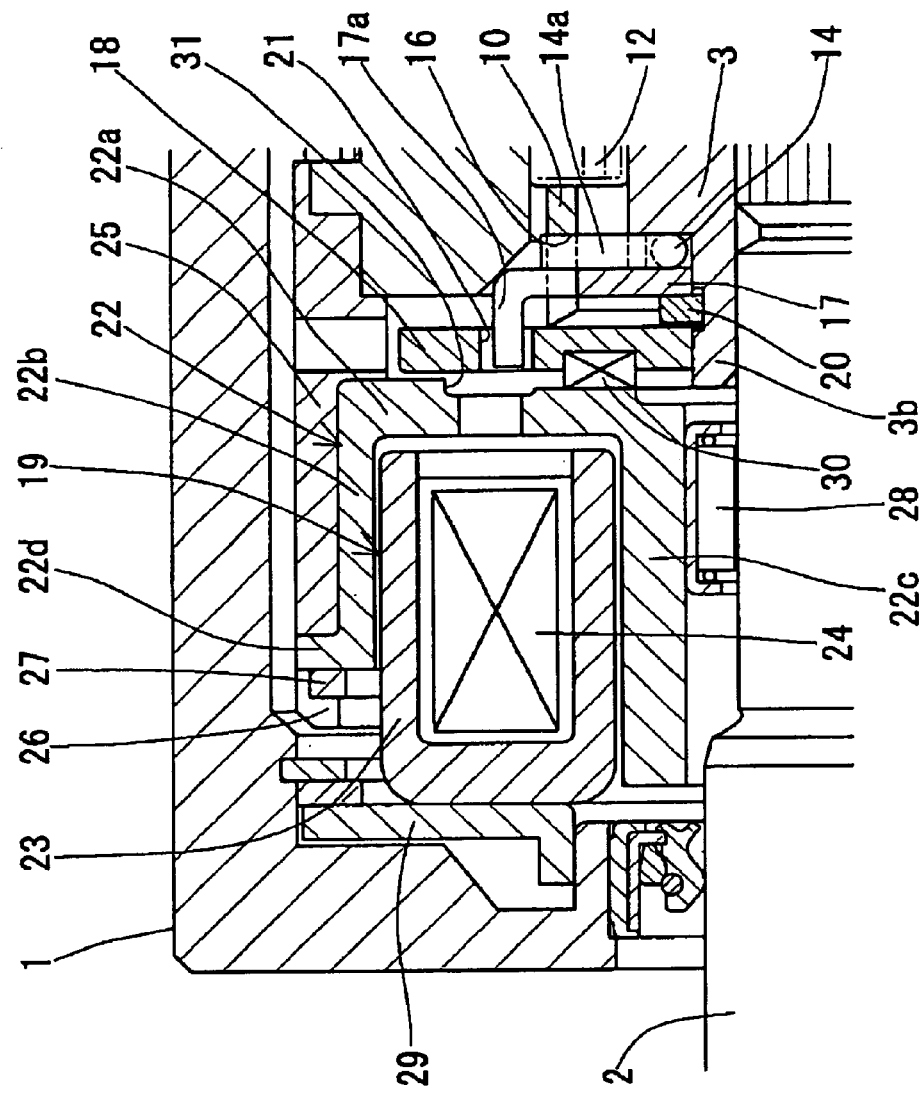
FIG. 4 is an enlarged sectional view of the portion adjacent to the electromagnet and the armature of FIG. 1.

As shown in FIG. 4, on the cylindrical portion 3b at the other end of the inner member 3, a support plate 17 and an armature 18 are fitted. A rotor 22 and an electromagnet 19 are arranged so as to axially oppose the armature 18.

The support plate 17 is prevented from coming out (being moved out of position) by a snap ring 20 mounted on the cylindrical portion 3b. A pair of engaging claws 17a are formed on the support plate 17 at its outer peripheral opposed positions. The respective engaging claws 17a are inserted in the pair of cutouts 16 formed at the end of the retainer 10. The engaging claws 17a are bent toward the armature 18 with their tips inserted in claw-inserting holes 21 formed in the armature 18. By this arrangement, the armature 18 is prevented from turning relative to the retainer 10 and is axially movable(movable along the axis of shaft 2).

The electromagnet 19 comprises a field core 23 axially opposing the rotor 22, and an electromagnetic coil 24 housed in the field core 23. The rotor 22 has an attracting plate portion 22a provided with cylindrical portions 22b, 22c at its outer-diameter and inner-diameter portions. A pair of protrusions 22d are formed on the outer periphery of an open end of the outer cylindrical portion 22b.

The outer cylindrical portion 22b is inserted in a rotor-supporting tube 25 located at one end of the outer member 5 so as to be integral therewith. The rotor 22 is prevented from turning with respect to tube 25 by the insertion of the protrusions 22d in a cutout 26 formed in the end of the rotor-supporting tube 25, and is prevented from coming out (being moved out of position) by a snap ring 27 mounted on the inner periphery of the end of the rotor-supporting tube 25. On the other hand, the inner cylindrical portion 22c is rotatably supported through a bearing 28.

The field core 23 is mounted on the housing 1 through a core-supporting plate 29.

An elastic member 30 is mounted between the rotor 22 and the armature 18. The elastic member 30 biases the armature 18 in such a direction as to move the armature 18 away from the attracting plate portion 22a of the rotor 22.

In the rotation transmission device having such a structure, when the electromagnetic coil 24 of the electromagnet 19 is not energized, the retainer 10 is held in the neutral position by the switch spring 14 with the engaging elements 12 held by the retainer 10 so as not to engage the cam surfaces 8 of the inner member 3 and the cylindrical surface 9 of the outer member 5.

Thus, the rotation of the inner member 3, which rotates together with the rotary shaft 2, is not transmitted to the outer member 5. The inner member 3 thus idles.

When the electromagnetic coil 24 of the electromagnet 19 is energized, the rotor 22 attracts the armature 18 against the elasticity of the elastic member 30. Due to the attraction, the retainer 10 is prevented from turning relative to the outer member 5, so that due to rotation of the inner member 3 relative to the retainer 10, the engaging elements 12 engage the cam surfaces 8 of the inner member 3 and the cylindrical surface 9 of the outer member 5. The rotation of the inner member 3 is thus transmitted to the outer member 5 through the engaging elements 12.

In the space between the cam surfaces 8 and the cylindrical surface 9, grease is sealed to lubricate the engaging surfaces between the engaging elements 12 and the cam surfaces 8 and the cylindrical surface 9. The grease contains a lithium-family thickening agent blended in a base oil of an ester-family synthetic oil. The grease has a viscosity at 40° C. of 15.3 mm$^2$/sec and a viscosity at 100° C. of 3.8 mm$^2$/sec.

The frictional torque when the rotor 22 and the armature 18 are attracted to each other has to be greater than the turning torque imparted to the retainer 10 by the switch spring 14. If the frictional torque is not stable, the retainer 10 and the armature 18 might be moved back to the neutral position by the force of the switch spring 14, so that it would be impossible to move the engaging elements 12 to the engaging position.

The frictional torque varies with the radius of the contact portion which is attracted by the rotor 22. If the attracting position is unstable, the frictional torque will be unstable. In particular, if the small-diameter portion of the armature 18 is attracted by the rotor 22, the frictional torque will be small, so that the armature 18 and the retainer 10 may be moved back to the neutral position by the elastic force of the switch spring 14.

Figure 6A:
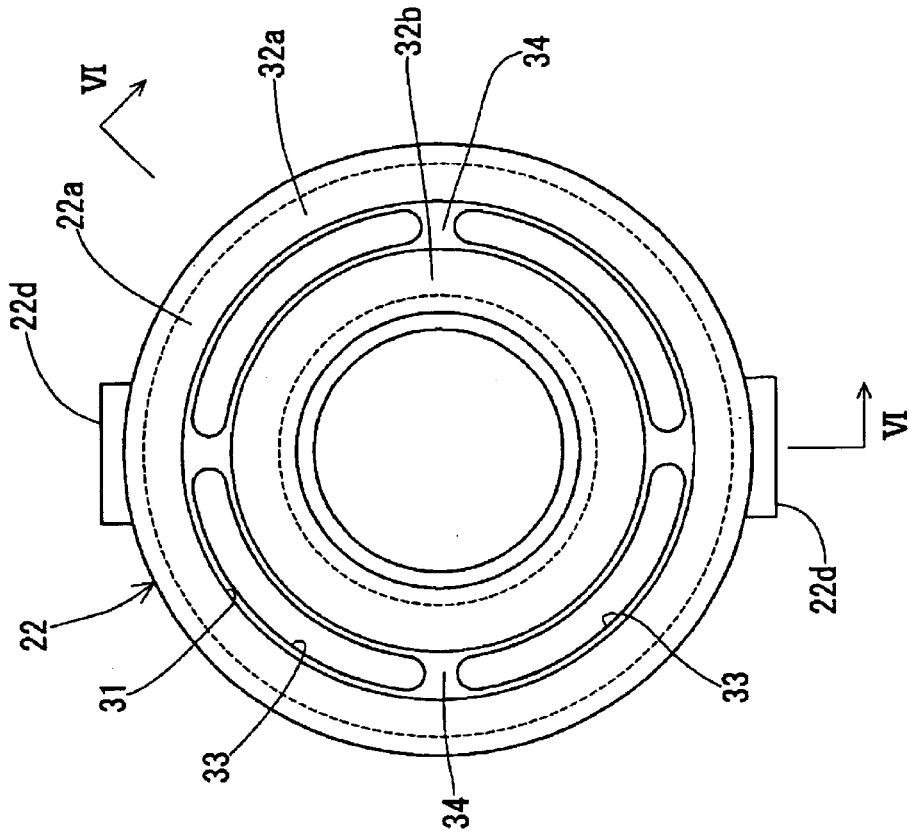
FIG. 6A is a front view of the rotor shown in FIG. 1.
Figure 6B:
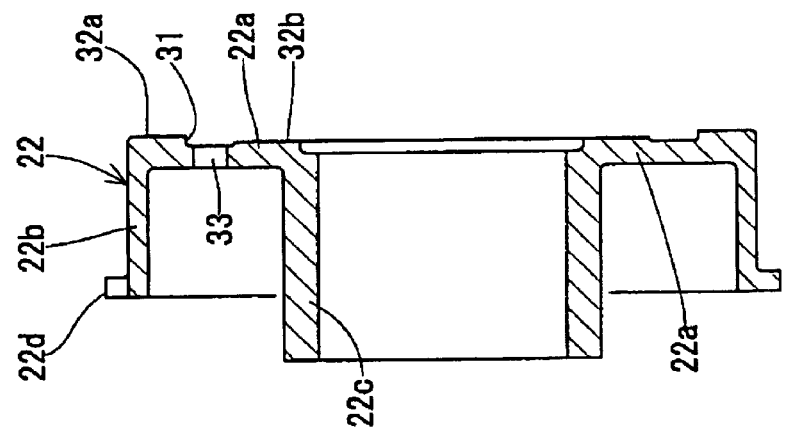
FIG. 6B is a sectional view along line VI—VI of FIG. 6A.

In order to stabilize the frictional torque, in the embodiment, as shown in FIGS. 6A, 6B, an annular groove 31 is formed in the attracting surface of the attracting plate portion 22a of the rotor 22, and a step is formed between an outer attracting surface 32a on the outer-diameter side of the annular groove 31 and an inner attracting surface 32b on the inner-diameter side of annular groove 31 such that the outer attracting surface 32a is above (i.e., further outward in an axial direction than) the inner attracting surface 32b. In other words, the outer attracting surface 32a is located closer to armature 18 than is the inner attracting surface 32b.

In the bottom of the annular groove 31 formed in the attracting plate portion 22a of the rotor 22, a plurality of arcuate elongated holes 33 are formed at equal intervals with pillar portions 34 formed between the adjacent elongated holes 33.

Figure 5:
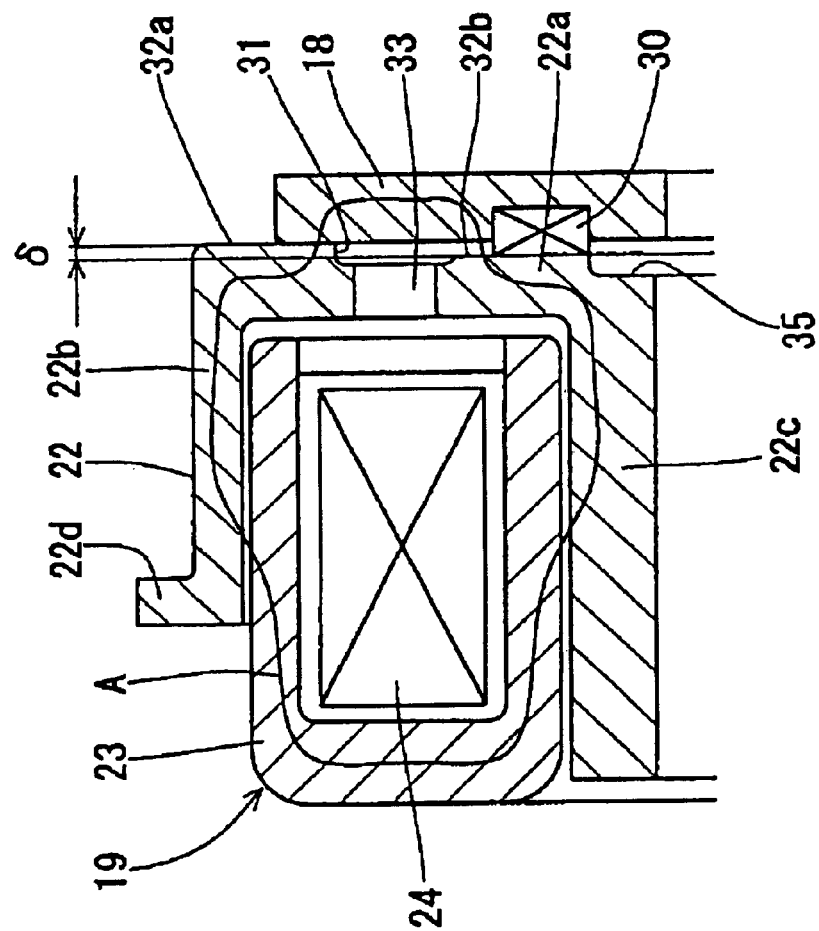
FIG. 5 is a sectional view showing the armature in an attracted state.

By providing the step between the outer attracting surface 32a and the inner attracting surface 32b of the attracting surface on the rotor 22, when the electromagnetic coil 24 is energized, as shown in FIG. 5, the armature 18 is attracted at the outer attracting surface 32a. Thus, the attracting position at which the rotor 22 attracts the armature 18 is always constant on the outer-diameter side, so that it is possible to obtain a stable frictional torque. Also, since the contact radius is large compared with the case in which the armature 18 is attracted at the inner attracting surface 32b, it is possible to obtain a large frictional torque.

The amount δ of the step between the outer attracting surface 32a and the inner attracting surface 32b is preferably about 20–60 μm. An air gap formed between the inner attracting surface 32b and the armature 18 will produce a magnetic loss. But since the attracting portion where the rotor 22 attracts the armature 18 is on the outer-diameter side, it is possible to obtain a torque sufficient to cover such a loss. If the amount of the step is larger than the above range, magnetic loss due to the air gap would be larger, so that the attracting force drops markedly. If it is below the above range, machining will be difficult.

By forming the annular groove 31 in the attracting surface of the attracting plate portion 22a of the rotor and forming the elongated holes 33 in the bottom of the annular groove 31, when the electromagnetic coil 24 is energized, the magnetic flux produced from the electromagnetic coil 24 is prevented from passing through the attracting plate portion 22a of the rotor 22. Thus, a magnetic closed circuit A shown in FIG. 5 is formed between the field core 23, rotor 22 and armature 18 with the magnetic flux produced by the electromagnetic coil 24. Thus, it is possible to reliably attract the armature 18. The attracting plate portion 22a of the rotor 22 has to have a sufficient thickness to ensure that the magnetic flux can pass easily in the magnetic closed circuit A.

On the other hand, some magnetic flux will flow through the pillar portions 34 shown in FIG. 6A and not through the armature 18, so that a certain amount of magnetic loss will be produced. But since the thickness of the pillar portions 34 is reduced by forming the annular groove 31 in the pillar portions 34, thereby reducing the magnetic flux passage, it is possible to keep the magnetic loss at a minimum.

As shown in FIG. 5, it is not required that any magnetic flux passes through the inner-diameter side of the rotor 22 where the elastic member 30 contacts. Thus, as shown in FIG. 5, a step is formed on the inner-diameter side 35 so as to be further lower than the inner attracting surface 32b. The amount of the step is 0.1 mm or greater. By providing such a step at the inner peripheral portion of the attracting surface of the rotor 22 where magnetic involvement is less, even if wear of the outer attracting surface 32a progresses, it is possible to prevent close contact of the inner peripheral portion of the armature 18 with the rotor 22.

In the embodiment shown in FIG. 4, the attracted surface of the armature 18 is a plane perpendicular to the axis, and a step is provided between the outer peripheral portion and the inner peripheral portion of the attracting surface of the attracting plate portion 22a of the rotor 22. But such a step may be provided between the outer peripheral portion and the inner peripheral portion of the attracted surface of the armature 18, and the attracting surface of the rotor may instead be a plane perpendicular to the axis.

Figure 7:
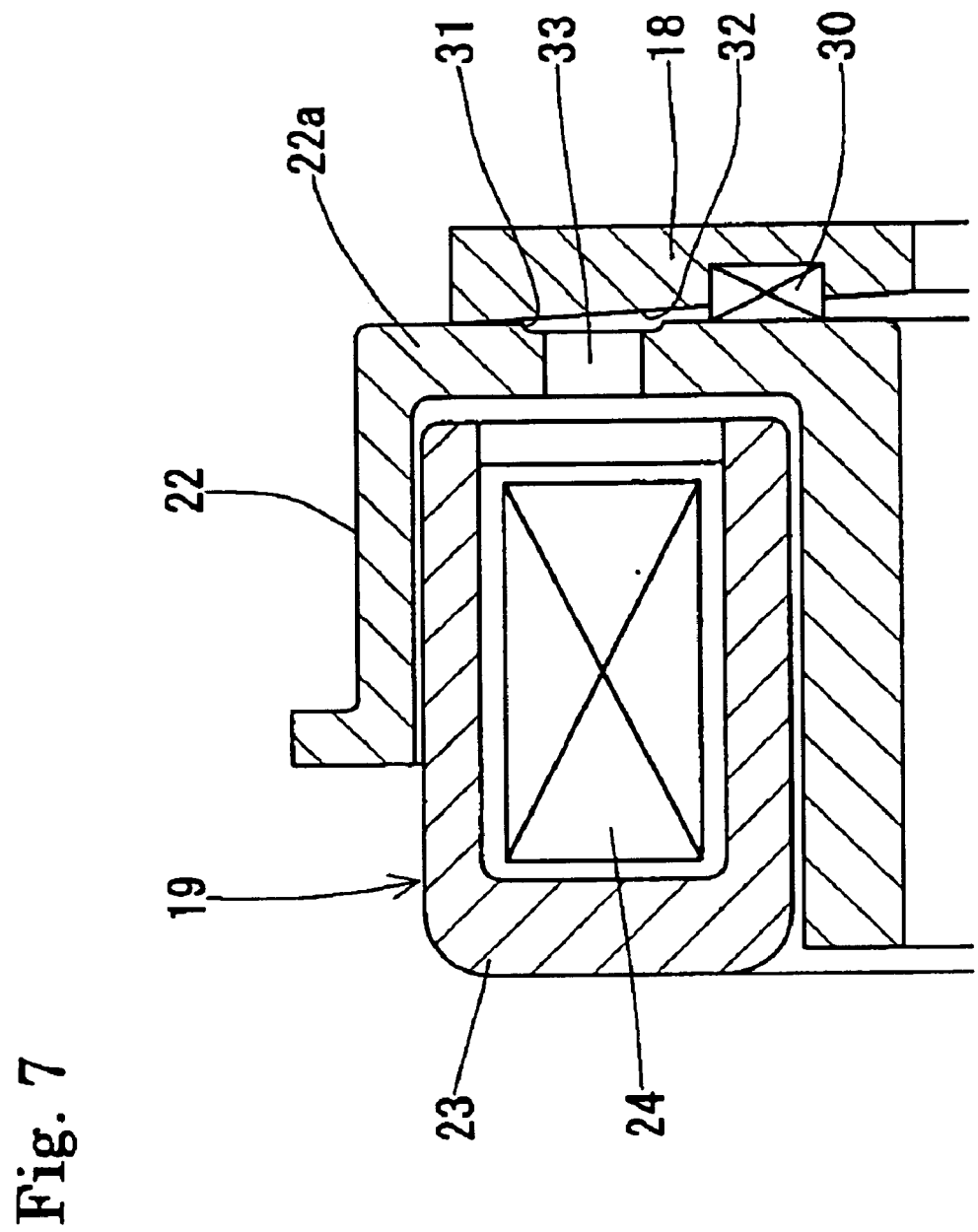
FIG. 7 is a sectional view showing another embodiment of the means for attracting the outer peripheral portion of the armature.

FIG. 7 shows another embodiment of the arrangement for attracting the large-diameter portion of the armature 18 to the rotor 22 of the electromagnet 19. In this embodiment, the attracted surface 32 of the armature 18 attracted to the rotor 22 is a tapered surface, the axial height of which gradually lowers (decreases) from the outer periphery of the armature 18 toward its inner periphery. Such a tapered surface is easy to form not only by grinding but by pressing, so that the manufacturing cost can be maintained low.

By forming the attracted surface 32 of the armature 18 as a tapered surface, when the rotor 22 of the electromagnet 19 attracts the armature 18, the large-diameter portion of the armature 18 is attracted by the rotor 22, so that it is possible to obtain a stable frictional torque.

The taper angle of the attracted surface 32 is restricted such that when the rotor 22 and the armature 18 are attracted to each other, the size of the gap formed at the outer periphery of the elastic member 30 will be about 20–60 μm.

In the embodiment, a roller type clutch in which the engaging elements 12 comprise rollers is mounted between the inner member 3 and the outer member 5. But a sprag type clutch may also be mounted, in which sprags are used as engaging elements, the outer peripheral surface of the inner member 3 and the inner peripheral surface of the outer member 5 are both cylindrical surfaces, and the sprags are retained by a pair of retainers, one for fixing and the other for control, which are arranged between both cylindrical surfaces. The angles of the sprags is controlled by the retainer for control so that transmission and shutoff of power will be changed over.

In the embodiment, a single flux type in which a magnetic flux reciprocates once between the rotor 22 and the armature 18 was shown. But this invention is also applicable to a so-called double-flux type electromagnetic clutch.

As described above, according to this invention, when the rotor of the electromagnet attracts the armature, the large-diameter portion of the armature is attracted. Thus it is possible to stabilize the frictional torque when the rotor attracts the armature and thus to reliably carry out changeover between engagement and disengagement of the rotor without delay.

Also, by attracting the large-diameter portion of the armature, it is possible to produce a predetermined frictional. torque while suppressing the size of the electromagnetic coil and electric power consumption, and to suppress heat buildup of the electromagnet.

What is claimed is:

1. A rotation transmission device comprising:
   an inner member;
   an outer member coaxially mounted with respect to said inner member such that said inner member and said outer member are operable to rotate relative to each other;
   a retainer mounted between said inner member and said outer member, said retainer having a plurality of pockets formed therein;
   engaging elements arranged in said pockets of said retainer;
   an armature mounted so as to be non-rotatable relative to said retainer and so as to be axially movable relative to said retainer, said armature having an attracted surface, said attracted surface having a radially outer section and a radially inner section;

a rotor mounted to one of said inner member and said outer member so as to axially oppose said attracted surface of said armature, said rotor and said armature being shaped and arranged so that an entire circumference of only said radially outer section of said attracted surface of said armature is operable to contact said rotor; and an electromagnet for attracting said armature to said rotor so as to change a position of said retainer from a neutral position to an engagement position whereat said engaging elements engage an outer periphery of said inner member and an inner periphery of said outer member to thereby transmit rotational torque between said inner member and said outer member.

2. The rotation transmission device of claim 1, wherein said attracted surface of said armature has a step formed between said radially outer section and said radially inner section so that said radially outer section is located closer to said rotor than is said radially inner section.

3. The rotation transmission device of claim 2, wherein said rotor has an attracting surface opposing said attracted surface of said armature, said attracting surface having an annular groove and arcuate elongated holes formed in the bottom of said annular groove, said arcuate elongated holes being arranged in a circumferential direction of said annular groove.

4. The rotation transmission device of claim 1, wherein said attracted surface of said armature comprises a gradually-tapered attracted surface being shaped such that said radially outer section of said gradually-tapered attracted surface is closer to said rotor than is said radially inner section of said gradually-tapered attracted surface.

5. The rotation transmission device of claim 4, wherein said rotor has an attracting surface opposing said gradually-tapered attracted surface of said armature, said attracting surface having an annular groove and arcuate elongated holes formed in the bottom of said annular groove, said arcuate elongated holes being arranged in a circumferential direction of said annular groove.

6. The rotation transmission device of claim 1, wherein said rotor has an attracting surface opposing said attracted surface of said armature, said attracting surface having an annular groove and arcuate elongated holes formed in the bottom of said annular groove, said arcuate elongated holes being arranged in a circumferential direction of said annular groove.

7. The rotation transmission device of claim 1, wherein said rotor and said armature are shaped and arranged so that when said radially outer section of said attracted surface contacts said rotor, said radially inner section is spaced a distance in a range of 20 $\mu$m to 60 $\mu$m from said rotor.

8. A rotation transmission device comprising:

an inner member;

an outer member coaxially mounted with respect to said inner member such that said inner member and said outer member are operable to rotate relative to each other;

a retainer mounted between said inner member and said outer member, said retainer having a plurality of pockets formed therein;

engaging elements arranged in said pockets of said retainer;

an armature mounted so as to be non-rotatable relative to said retainer and so as to be axially movable relative to said retainer;

a rotor mounted to one of said inner member and said outer member so as to axially oppose said armature; and an electromagnet for attracting said armature to said rotor so as to change a position of said retainer from a neutral position to an engagement position whereat said engaging elements engage an outer periphery of said inner member and an inner periphery of said outer member to thereby transmit rotational torque between said inner member and said outer member;

wherein one of said rotor and said armature has a radially outer portion and a remaining portion, said radially outer portion axially protruding farther than said remaining portion toward the other of said rotor and said armature, said radially outer portion having an attraction surface facing the other of said rotor and said armature, said rotor and said armature being shaped and arranged such that an entire circumference of only said attraction surface of said radially outer portion is operable to contact the other of said rotor and said armature.

9. The rotation transmission device of claim 8, wherein said one of said rotor and said armature has a step formed between said radially outer portion and a radially inner portion so that said attraction surface of said radially outer section is located closer to the other of said rotor and said armature than is a surface of said radially inner portion.

10. The rotation transmission device of claim 9, wherein said rotor has an attracting surface opposing said armature, said attracting surface having an annular groove and arcuate elongated holes formed in the bottom of said annular groove, said arcuate elongated holes being arranged in a circumferential direction of said annular groove.

11. The rotation transmission device of claim 8, wherein said armature has a gradually-tapered surface opposing said rotor, said gradually-tapered surface including said attraction surface and being shaped such that said attraction surface of radially outer portion of said armature is closer to said rotor than is a radially inner section of said gradually-tapered surface.

12. The rotation transmission device of claim 11, wherein said rotor has an attracting surface opposing said gradually-tapered surface of said armature, said attracting surface having an annular groove and arcuate elongated holes formed in the bottom of said annular groove, said arcuate elongated holes being arranged in a circumferential direction of said annular groove.

13. The rotation transmission device of claim 8, wherein said rotor has an attracting surface opposing said armature, said attracting surface having an annular groove and arcuate elongated holes formed in the bottom of said annular groove, said arcuate elongated holes being arranged in a circumferential direction of said annular groove.

14. The rotation transmission device of claim 8, wherein said rotor and said armature are shaped and arranged so that when said attraction surface of said radially outer portion of said one of said rotor and said armature contacts the other of said rotor and said armature, a surface of a radially inner portion of said one of said rotor and said armature is spaced a distance in a range of 20 $\mu$m to 60 $\mu$m from the other of said rotor and said armature.

* * * * *